United States Patent [19]

Broecker et al.

[11] 3,897,377

[45] July 29, 1975

[54] PROCESS FOR THE MANUFACTURE OF SYNTHETIC RESINS WITH URETHANE GROUPS, WHICH ALSO CONTAIN CARBOXYL GROUPS AND CAN BE DILUTED WITH WATER

[75] Inventors: Bernhard Broecker, Hamburg; Wolfram Plettner, Glinde, both of Germany

[73] Assignee: Reichold-Albert-Chemie Aktiengesellschaft, Hamburg, Germany

[22] Filed: Dec. 12, 1973

[21] Appl. No.: 424,111

[30] Foreign Application Priority Data
Dec. 14, 1972 Switzerland.................... 018260/72

[52] U.S. Cl....... 260/18 TN; 117/161 KP; 204/181; 260/29.2 TN; 260/77.5 CR; 260/77.5 TB
[51] Int. Cl.² ............... C08G 22/16; C08G 22/32; C08G 51/24
[58] Field of Search... 260/77.5 TB, 18 TN, 29.2 TN, 260/77.5 CR

[56] References Cited
UNITED STATES PATENTS

| | | | |
|---|---|---|---|
| 2,801,990 | 8/1957 | Seeger et al. | 260/77.5 TB |
| 2,877,212 | 3/1959 | Seligman | 260/77.5 TB |
| 3,299,007 | 1/1967 | Sueling et al. | 260/77.5 TB |
| 3,438,922 | 4/1969 | Ueno et al. | 260/77.5 TB |
| 3,660,359 | 4/1972 | Labana | 260/77.5 TB |
| 3,719,522 | 3/1973 | Johnson et al. | 260/77.5 TB |
| 3,773,729 | 11/1973 | Wakimoto et al. | 260/77.5 TB |
| 3,799,854 | 3/1974 | Jerabek | 260/29.2 TN |

*Primary Examiner*—H. S. Cockeram
*Attorney, Agent, or Firm*—Gordon W. Hueschen

[57] ABSTRACT

The present invention relates to a process for the manufacture of thermosetting synthetic resins with urethane groups, which contain carboxyl groups and masked isocyanate groups and can be diluted with water, and which are manufactured by reaction of a compound (*a*) which contains alcoholic hydroxyl groups and carboxyl groups, with a masked isocyanate (*b*) in inert organic solvents.

The present invention also relates to the use of the synthetic resins manufactured according to the invention as binders in coating agents for electrophoretic lacquering. The following advantages are achieved by the process of the present invention:

Binders which can be diluted with water and are suitable for the electrophoretic coating process are obtained, which are distinguished by very good throwing power and by very good resistance of the stoved films to washing lyes or aqueous sodium chloride solution at 0° to 100°C.

8 Claims, No Drawings

PROCESS FOR THE MANUFACTURE OF SYNTHETIC RESINS WITH URETHANE GROUPS, WHICH ALSO CONTAIN CARBOXYL GROUPS AND CAN BE DILUTED WITH WATER

BACKGROUND OF THE INVENTION

1. Prior art

German Offenlegungsschrift 2,008,620 describes water-dispersible polyurethane resins which are obtained by reaction of a polyol resin with organic polyisocyanate. These binders again do not contain any thermally cross-linkable isocyanate and must, for better crosslinking, be mixed additionally with phenoplasts or aminoplasts. The corrosion resistance achieved with these binders is inadequate.

"Methoden der organischen Chemie" ("Methods of Organic Chemistry") (Houben-Weyl), volume XIV/2, Georg Thieme Verlag, Stuttgart, describes, on pages 61 to 65, that isocyanates can be masked by reacting them with compounds which are split off again at elevated temperature. On page 64 it is stated that it is also possible to manufacture so-called mono-adducts which are obtained by reaction of polyisocyanates with masking components in such ratios that one isocyanate group remains free.

It is furthermore stated there that the presence of tertiary amine accelerates the reverse decomposition of the masked isocyanate groups. If such masked isocyanates are mixed with compounds carrying alcoholic hydroxyl groups and carrying carboxyl groups, turbid mixtures are as a rule obtained and additionally turbid films are produced after stoving. It was therefore completely surprising that the synthetic resins manufactured according to the invention give clear films on stoving. Furthermore, it was completely surprising that the aqueous solutions manufactured by neutralisation with ammonia or organic amines display excellent stability even when tertiary amines are employed as neutralising agents.

German Offenlegungsschrift 1,794,045 describes a process for the manufacture of a storage-stable polyurethane with masked isocyanate groups, wherein a polyisocyanate is reacted partly with phenol and partly with aliphatic compounds capable of reactions with isocyanates. However, this product is only storage-stable in an excess of phenol and is unsuitable for the manufacture of binders which can be diluted with water.

German Auslegeschrift 1,061,013 describes a process for the manufacture of lacquers wherein masked isocyanates are reacted with compounds with active hydrogen atoms. However, these masked isocyanates are incompatible with the component (a) according to the invention and are therefore unsuitable for the reaction.

German Offenlegungsschrift 2,020,905 describes a process for the manufacture of high molecular blocked isocyanate polymers in which partially blocked isocyanates having at least one free NCO group are reacted with compounds containing active hydrogen. Polyester-polyols, polyether-polyols or copolymers containing OH are used as such high molecular compounds. However, the products thus obtained are either not compatible with water or, if they are compatible with water, are neither suitable for electrophoretic application, since they are of non-ionic structure, nor possess, in the form of stoved films, sufficient resistance to water or aqueous sodium chloride solution, as is shown by comparison test 3.

German Offenlegungsschrift 2,118,692 or U.S. Pat. No. 3,773,729 describes a process for the manufacture of blocked isocyanate polymers which are obtained by reaction of a polyisocyanate having at least one free isocyanate group and at least one blocked isocyanate group with a compound containing OH and carrying carboxyl groups. However, the process described there has the disadvantage that undesired side-reactions frequently occur during the reaction and that gelling frequently takes place (comparison test 6). Furthermore, this process frequently gives products which when dissolved in organic water-miscible solvents display thixotropic behaviour.

2. Field of the invention

The present invention also relates to the use of the synthetic resins manufactured according to the invention as binders in coating agents for electrophoretic lacquering. The following advantages are achieved by the process of the present invention:

1. Binders which can be diluted with water and are suitable for the electrophoretic coating process are obtained, which are distinguished by very good throwing power and by very good resistance of the stoved films to washing lyes or aqueous sodium chloride solution at 0° to 100°C.

2. When making the new polyurethane resins the reaction between the components (a) and (b) can be carried out under non-critical conditions and without the danger of gelling, and on reaching the desired degree of conversion and the desired viscosity the reaction can be stopped at any time by cooling.

SUMMARY

The present invention relates to a process for the manufacture of thermosetting synthetic resins with urethane groups, which contain carboxyl groups and masked isocyanate groups and can be diluted with water, and which are manufactured by reaction of a compound (a) which contains alcoholic hydroxyl groups and carboxyl groups, with a masked isocyanate (b) in inert organic solvents, characterised in that as the compound (a) there are used copolymers, individually or as mixtures, which contain alcoholic hydroxyl groups and carboxyl groups, have a molecular weight of about 300 to about 10,000, a hydroxyl equivalent weight of 200 to 900 and acid numbers of about 30 to 150, based on carboxyl groups, and which must be soluble in inert polar organic solvents, only those copolymers being employed of which the carboxyl groups are not capable of significant reaction with masked isocyanate groups at temperatures of 80° to 150°C over the course of about one hour, and as the masked isocyanate (b) there is used a polyurethane which contains at least one masked isocyanate group and which has been obtained by reaction of a polyisocyanate with a free isocyanate group and at least one masked isocyanate group and at most up to 5 masked isocyanate groups with a compound carrying low molecular alcoholic hydroxyl groups, having a molecular weight of about 120–2,000 and a hydroxyl equivalent weight of about 60–500, the compound having been chosen from the group consisting of esters of fatty acids with polyols, wherein the polyols should be at least trifunctional but preferably should contain more than 3 hydroxyl groups but at most 6 hydroxyl groups, and diols which carry terminal OH groups and in which 3–8 carbon atoms are aliphatically bonded between the OH groups, and that the components (a)+(b) are reacted at temperatures of 80° to 150°C, that the component (a) is employed in such amounts that the end product has acid numbers between about 30 to 120, that the proportion of calculated isocyanate groups (introduced when manufacturing the component b) is between 7.5 and 20 % by weight (relative to the weight of the end product) and that the end product is completely soluble in a 50 % strength solution in ethylene glycol monobutyl ether and has a viscosity between 150 and 700 cP in this solution at 25°C and that the amount of the component (b) which is employed is such that the mixture of component (a)+(b) before reaction contains 2 to 15 % by weight of masked isocyanate groups relative to the sum of (a)+(b).

As the component (a) containing alcoholic hydroxyl groups and carboxyl groups and having a molecular weight of about 300 to 10,000 and a hydroxyl equivalent weight of about 200 to 900 and acid numbers of about 30 to 150 it is possible to use: Copolymers of 4–20 % acrylic acid and/or methacrylic acid, 40–70 % of plasticising copolymerised monomers, such as alkyl acrylates or alkyl methacrylates in which the alkyl radical contains 4 to 12 carbon atoms, it being possible for the copolymer optionally also to contain 5–35 % of other monomers, such as styrene, vinyltoluene, acrylonitrile and 8–15 % of hydroxyalkyl acrylate being contained in the acrylate or methacrylate copolymer, examples of usable hydroxyalkyl acrylates being: Hydroxyalkyl acrylates or methacrylates, and polyoxypropylene acrylates or methacrylates of the general formula:

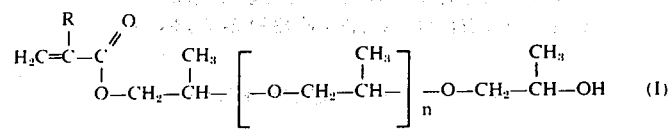

wherein $n$ represents values between 2 and 6, R is hydrogen or a methyl group and the compound of the formula (I) or mixtures of these compounds having hydroxyl numbers of about 100 to 200.

In place of the hydroxyalkyl acrylate it is also possible to use allyl compounds, such as allyl alcohol, allyloxy propanol, trimethylpropane diallyl ether, pentaerythritol triallyl ether and similar compounds.

The vinyl ester of an α-alkylalkanemonocarboxylic acid, which has become known by the name of Versatic Acid, is also outstandingly suitable for use as a plasticising monomer. The α-alkylalkanemonocarboxylic acids are based on a $C_9$-, $C_{10}$- and $C_{11}$-acid which results from the pioneering work of Dr. H. Koch of the Max-Planck-Institut fur Kohlenforschung in Muhlheim, Federal Republic of Germany. According to this work, the α-alkylalkanoic acids are mainly a mixture of $C_9$-, $C_{10}$- and $C_{11}$-monocarboxylic acids. The acids are completely saturated and are very heavily substituted at the carbon atom in the α-position. Acids with two hydrogen atoms on the α-carbon atom are not present and only 6–7 % of these acids contain a hydrogen atom on the α-carbon atom. In addition, cyclic material is present (Deutsche Farben Zeitschrift, issue 10/16th year of publication, page 435).

Suitable polymer resins are mentioned in Table 1.

Those polymer resins mentioned in Table 2 are particularly preferred within the scope of the present invention and give light-coloured binders with very good resistance to wash lyes.

Table 1

| Copolymer | Monomer carrying carboxyl groups, in % by weight | Monomer carrying OH groups, in % by weight | Further monomers, in % by weight | Viscosity in cP at 25°C (measured at 50 % strength in ethylene glycol monobutyl ether) |
|---|---|---|---|---|
| A | 15 acrylic acid | 14 hydroxyethyl methacrylate | 50 vinylversatate 21 methylmethacrylate | 470 |
| B | 20 acrylic acid | 15 hydroxyethyl methacrylate | 50 vinylversatate 15 methylmethacrylate | 545 |
| C | 20 acrylic acid | 16 hydroxypropyl acrylate | 49 vinylversatate 15 methylmethacrylate | 480 |
| D | 20 acrylic acid | 16 hydroxybutyl acrylate | 49 vinylversatate 15 methylmethacrylate | 440 |
| E | 20 acrylic acid | 130 allyl oxypropanol | 47 2-ethylhexylacrylate 20 styrene | 400 |

Table 2

| Copolymer | Monomer carrying carboxyl groups, in % by weight | Monomer carrying OH groups, in % by weight | Further monomers, in % by weight | viscosity in cP at 25°C, (measured at 50% strength in ethylene glycol monobutyl ether) |
|---|---|---|---|---|
| A | 20 acrylic acid | 20 hydroxyethyl methacrylate | 40 2-ethylhexyl acrylate 20 styrene | 410 |
| B | 20 acrylic acid | 15 allyloxypropanol | 40 2-ethylhexyl acrylate 25 styrene | 490 |
| C | 10 acrylic acid 10 methacrylic acid | 25 hydroxyethyl methacrylate | 40 2-ethylhexyl acrylate 15 styrene | 550 |

Table 2 — Continued

| Copolymer | Monomer carrying carboxyl groups, in % by weight | Monomer carrying OH groups, in % by weight | Further monomers, in % by weight | viscosity in cP at 25°C, (measured at 50% strength in ethylene glycol monobutyl ether) |
|---|---|---|---|---|
| D | 20 acrylic acid | 20 hydroxyethyl acrylate | 20 vinylversatate 20 methyl methacrylate | 370 |
| E | 20 acrylic acid | 20 hydroxyethyl methacrylate | 40 isobutyl acrylate 20 styrene | 470 |
| F | 20 acrylic acid | 15 hydroxyethyl methacrylate | 40 2-ethylhexyl acrylate 25 acrylonitrile | 500 |
| G | 15 acrylic acid | 15 hydroxyethyl methacrylate | 45 2-ethylhexyl acrylate 25 styrene | 436 |
| H | 20 acrylic acid | 15 hydroxyethyl methacrylate | 40 2-ethylhexyl acrylate 25 styrene | 432 |

Especially suitable copolymers to be employed in step (a) have molecular weights of about 300 to about 10,000, a hydroxyl equivalent weight of 200 to 900 and acid numbers of about 30 to 150 of carboxyl groups and are soluble in inert polar organic solvents. These copolymers contain so many carboxyl groups that the resins have acid numbers of between 80 and 150, the chosen unsaturated acids having as high an acidity as possible, that is a pK value of <4. The other monomers should not easily be saponified, that is 2-ethylhexyl acrylate is more suitable than butylacrylate and vinylversatate is suited best. Styrene also is more suitable than methylmethacrylate. In all cases, however, a compromise has to be found for all polymerization parameters. The viscosity of the resins should amount to between 320 and 640 cP at 25°C, measured at 50 % strength ethylene glycol monobutyl ether.

Possible components (b) are polyurethanes with at least one blocked isocyanate group, which are obtained by reaction of a polyisocyanate group with molecular weights of 100 to 1,000, having at least one free and one masked isocyanate group, with a low molecular compound carrying alcoholic hydroxyl groups, having a molecular weight of about 120 to 2,000 and a hydroxyl equivalent weight of 60 to 500.

Suitable compounds, carrying hydroxyl groups, of this type are above all esters of fatty acids with polyols, wherein the polyols should be at least trifunctional but should preferably contain more than 3 hydroxyl groups and at most 6 hydroxyl groups. Suitable polyols of this type are trimethylolpropane, glycerine, pentaerythritol, hexanetriol, sorbitol and sucrose. Suitable fatty acids are unsaturated fatty acids, such as linseed oil fatty acid, soya oil fatty acid, tall oil fatty acid, linoleic acid, elaidic acid, castor oil fatty acid and ricinoleic acid and/or saturated fatty acids, such as coconut oil fatty acid, pelargonic acid and isononanoic acid. Diols with terminal OH groups, wherein 3–8 aliphatically bonded carbon atoms should be present between the OH groups, such as 1,4-butanediol or 1,6-hexanediol, are also suitable.

Suitable hydroxyl group containing compounds are given in Table 3.

Table 3

| fatty acid or oil | polyol | molar ratio | number of free hydroxyl groups |
|---|---|---|---|
| isomeric mixture of isononanic acid | pentaerythritol | 1 : 1 | 3 |
| " | pentaerythritol | 1.5 : 1 | 2.5 |
| " | trimethylol propane | 1 : 1 | 2 |
| " | glycerol | 1 : 1 | 2 |
| coconut oil | pentaerythritol | 1 : 2 | 8 |
| coconut oil | trimethylol propane | 1 : 2 | 6 |
| dehydrated castor oil fatty acid | trimethylol propane | 1 : 1 | 2 |
| tall oil fatty acid | trimethylol propane | 1 : 1 | 2 |
| linseed oil fatty acid | pentaerythritol | 1 : 1 | 3 |
| dehydrated castor oil | pentaerythritol | 1 : 1.7 | 6.7 |

As polyisocyanates with at least one blocked isocyanate group it is possible to use compounds which are obtained by reacting arylene-diisocyanates or their alkylation products, such as phenylene-diisocyanates, naphthylene-diisocyanates, diphenylmethane-diisocyanates, toluylene-diisocyanates, di- or tri-isopropylbenzenediisocyanate or triphenylmethane-triisocyanate, aralkyldiisocyanates, such at 1-(isocyanatophenyl)-ethylisocyanate or dixylylene-diisocyanates, ethylene glycol diphenyl ether-2,2'-diisocyanate, diethylene glycol diphenyl ether-2,2'-diisocyanate, naphthalene-1,4-diisocyanate, 1,1-dinaphthyl-2,2'-diisocyanate, bisphenyl-2,4'-diisocyanate, diphenyl-4,4'-diisocyanate, benzophenone-3,3'-diisocyanate, 1-methylbenzene-2,4,6-triisocyanate, naphthalene-1,3,7-triisocyanate, diphenylmethane-2,4,4'-triisocyanate, triphenylmethane-4,4',4''-triisocyanate, 3-methoxyhexane-diisocyanate, octane-diisocyanate, Ω,Ω-diisocyanate-1,4-diethylbenzene, cyclohexane-1,3-diisocyanate, 1-isopropylbenzene-2,4-diisocyanate, 1-chlorobenzene-2,4-diisocyanate, diphenyl ether-2,4'-diisocyanate, diphenyl ether-4,4'-diisocyanate and polyphenyl isocyanate of the general formula

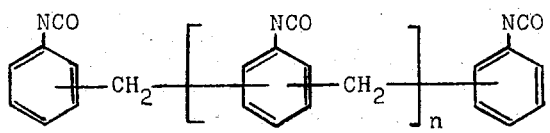

wherein $n=1$ to 3, and also cycloaliphatic compounds, such as, for example, cyclohexane-1,4-diisocyanate and aliphatic isocyanates, for example tetramethylene-1,4-diisocyanates and hexamethylene-1,6-diisocyanate, with compounds which contain acid hydrogen atoms, such as, for example, phenol or alkyl compounds of phenol, such as xylenol, tert.-butylphenol, nonylphenol, amides, imides or lactams of carboxylic acids, such as, for example, ε-caprolactam, succinimide, phthalimide, maleimide and acrylic acid amide, and also malonic acid esters, such as malonic acid diethyl ester, malonic acid dimethyl ester, and acetoacetic acid esters, such as acetoacetic acid methyl ester and acetoacetic acid ethyl ester.

Amongst the polyisocyanates there are particularly preferred technical mixtures of 65–80 % by weight of 2,4-toluylenediisocyanate and 35–20 % by weight of 2,6-toluylene-diisocyanate or hexamethylene-diisocyanate alone.

Amongst the masking components there are particularly preferred: Phenol and ε-caprolactam.

The reaction for manufacturing the component (b) is carried out by mixing and warming, the reaction being continued until no further free isocyanate is detectable (by titration with dibutylamine, for instance). On average, reaction times of 3 to 10 hours are required. The reaction is in general carried out in the presence of anhydrous inert solvents, for example in the presence of dioxane, methyl ethyl ketone, methyl isobutyl ketone, ethyl acetate, butyl acetate, acetone, benzene, xylene and toluene. The reaction temperature should be at least 20°C below the reverse decomposition temperature of the thermally crosslinkable isocyanate groups. It lies, depending on the masking component, between 20° and 120°C and preferably between 60° and 80°C.

The ratio of masked polyisocyanate and low-molecular compounds carrying alcoholic hydroxyl groups is so chosen that in the reaction the resulting polyurethane only retains a few hydroxyl groups, if any, that is to say the molar ratio of OH groups to free isocyanate groups is in the reaction between 1.5:1 and 1:1.

The component (b) thus obtained is then reacted with the component (a) by mixing and warming. The reaction temperature is determined by the reverse decomposition temperature of the masked isocyanate groups, that is to say it is chosen to be sufficiently high that at least a part of the blocked isocyanate groups react with a part of the hydroxyl groups of the component (a). The fact that this takes place can be ascertained from the increase in the viscosity of the reaction mixture.

The reaction between the components (a)+(b) is preferably carried out in the presence of inert solvents, such as acetone, methyl ethyl ketone, methyl isobutyl ketone, ethyl acetate, xylene and the like. The solvent chosen naturally depends on the reaction temperature. The reaction is continued until the desired final viscosity is reached. The viscosities of the end products should be between 150 cP and 700 cP at 25°C, measured at 50 % strength in butylglycol. Under the chosen conditions, the carboxyl groups of the component (a) do not as a rule participate in the reaction. If after a reaction time of 1 hour a decrease in the acid number of more than 5 units takes place in the reaction, either the reaction temperature has been chosen to be too high or the component (a) of the mixture is unsuitable for the reaction because of its carboxyl group being too strongly acid.

After completion of the reaction between the components (a) and (b) the inert solvents are removed by distillation, optionally under reduced pressure. At this stage, if the components (a) and the components (b) have been chosen correctly qualitatively, there must not only be 2–15 % by weight of thermally crosslinkable isocyanate in the end product, but the end product must also have an acid number of between 30 and 100 and the solid resin must dissolve clearly in ethylene glycol monobutyl ether at 20°C in at least a weight ratio of 1:1.

The end products are then diluted with hydrophilic solvents. Suitable hydrophilic solvents of this nature are above all monoethers of ethylene glycol, such as ethylene glycol monoethyl ether, ethylene glycol monoisopropyl ether and ethylene glycol monobutyl ether. However, lower alcohols, such as propanol, isopropanol and butanol, ketone-alcohols, such as diacetone-alcohol, and lower ketones, such as, for example, methyl ethyl ketone, are also suitable. The resins are then neutralised with ammonia or organic amines and can thereafter be diluted in any desired proportions with water. By organic amines there are to be understood, in this context, compounds which give a pH value of at least 8 in 10% strength aqueous solution at 20°C. As such it is possble to use, for example, triethylamine, triethanolamine, triisopropanolamine, diglycolamine, diethylamine, piperidine, pyridine, morpholine, diethanolamine, dimethylethanolamine and methylethanolamine, but anorganic bases, such as potassium hydroxide and sodium hydroxide, are also suitable. The new synthetic resins, capable of dilution with water, obtained according to the process of the invention can be used as sole binders in aqueous coating agents. They are particularly suitable for electrophoretic lacquering. When used as electrophoresis binders, the new synthetic resins produced according to the invention are above all distinguished in that even products of relatively low molecular weight, the viscosity of which lies in the range of 64 to 226 cP, measured at 50 % strength in butyl glycol at 25°C, show excellent values of the throwing power, above all after neutralisation with ammonia. This makes it possible to dilute the resins with only relatively small amounts of hydrophilic solvents so that the aqueous solutions then only contain extremely small amounts of organic solvents. Furthermore, the electrophoretic baths are distinguished by excellent stability.

The new synthetic resins produced according to the invention can be used as sole binders for aqueous stoving lacquers. The stoving temperature of coatings made thereof varies between 130° and 170°C depending on the masking component used. The coating films obtained after stoving are distinguished by particularly good corrosion resistance. They can therefore be used as a primer. In addition to being used as priming resins, the new products made according to the invention can also be used as single-coat binders. The one-layer coatings thus obtained are distinguished by good adhesion, good elasticity and good stability of the colour shade. Particularly when using polyisocyanates based on aliphatic isocyanates, the binders according to the invention are also distinguished by excellent stability to weathering.

The coatings made from these products are furthermore distinguished by excellent stability to wash lyes; the products are above all very resistant to boiling dilute detergent solutions.

MANUFACTURE OF THE PRE-PRODUCT I 350 g of toluylene-diisocyanate are dissolved in 400 g of methyl ethyl ketone. 0.2 g of dibutyl-tin dilaurate is added and 188 g of phenol are then added. After the exothermic reaction has subsided, the reaction mixture is kept at 60°C until the isocyanate content has fallen to 2.1 mval/g. The product may probably be described by the following formula:

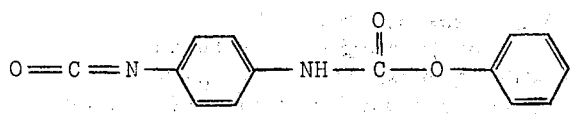

This solution was then added dropwise at 80°C to 195 g of an ester which was obtained by esterification of 158 g of isononanoic acid with 135 g of pentaerythritol at 220°C, and the reaction batch was kept at 80°C until the content of free NCO groups was practically zero. The content of masked isocyanate is 13.2 % by weight (relative to solid resin).

MANUFACTURE OF THE PRE-PRODUCT II

The instructions given for pre-product I are followed. Then, however, the instructions given below are followed:

This solution was then added dropwise at 80°C to 375 g of an ester which was obtained by trans-esterification of 300 g of castor oil with 75 g of pentaerythritol in the presence of 0.2 g of calcium acetate, and the reaction mixture was kept at 80°C until the content of free NCO groups was practically zero.

The content of masked isocyanate is 9.2 % by weight (relative to solid resin).

MANUFACTURE OF THE PRE-PRODUCT III 940 g of phenol-masked toluylene-diisocyanate (see pre-product I) are slowly added to 90 g of 1,4-butylene glycol at 60°C. The mixture is kept at 80°C until the isocyanate content of free isocyanate has fallen to zero.

The content of masked isocyanate is 15.5 % by weight (relative to solid resin).

MANUFACTURE OF THE PRE-PRODUCT IV

The procedure followed is as in the manufacture of the pre-product I but instead of the phenol 226 g of ε-caprolactam are employed. The mixture is kept until an isocyanate content of 1.95 mval/g is reached and is then reacted with the isononanoic acid ester as described in the manufacture of the pre-product I. The content of masked isocyanate is 12.5 % by weight (relative to solid resin).

MANUFACTURE OF PRE-PRODUCT V 168 g of hexamethylene-diisocyanate are dissolved in 200 g of methyl ethyl ketone. 94 g of phenol are added thereto and the reaction mixture is warmed to 60°C until the isocyanate content has fallen to 2.1 mval/g.

The reaction product is then added dropwise at 80°C to 110 g of the isononanoic acid ester described in the pre-product I and the reaction is continued until the isocyanate content has fallen to zero.

The content of masked isocyanate is 11.3 % by weight (relative to solid resin).

MANUFACTURE OF PRE-PRODUCT VI 350 g of commercial mixture of isomers of 2,4- and 2,6-toluylene-diisocyanate are dissolved in 200 g of methyl ethyl ketone. 0.2 g of dibutyl tin dilaurate are added and also a total of 170 g ε-caprolactam in small portions. After ceasing of the exothermic reaction the mix is kept at 70°C until the content of isocyanate has dropped to 3.5 mval/g. The solution is then added dropwise at 80°C to 345 g of the ester obtained by esterification of 158 g of commercial mixture of isomers of isononamic acid and 135 g of trimethylolpropane. The mix is kept at 80°C until the content of isocyanate has dropped to zero.

The content of masked isocyanate amounts to 7.3 % by weight (relative to solid resin).

MANUFACTURE OF PRE-PRODUCT VII

The procedure followed is as in the manufacture of the pre-product VI. Then the solution of the masked isocyanate, however, is added dropwise at 70°C to 410 g of the ester obtained by esterification of 270 g of coconut oil and 90 g of trimethylolpropane at 250°C. The mix is kept at 70°C until the content of free isocyanate has dropped to zero. The content of masked isocyanate amounts to 6.7 % by weight (relative to solid resin).

MANUFACTURE OF PRE-PRODUCT VIII

The procedure followed is as in the manufacture of the pre-product VI. Then, however, the solution of the masked isocyanate is added dropwise at 70°C to 360 g of the ester obtained by transesterification of 270 g of coconut oil with 90 g of pentaerythritol. The mix is kept at 80°C until the content of free isocyanate has dropped to zero.

The content of masked isocyanate amounts to 7 % by weight (relative to solid resin).

MANUFACTURE OF THE COMPONENT $a_1$ 200 g of acrylic acid, 200 g of hydroxyethyl methacrylate, 200 g of styrene and 400 g 2-ethylhexyl acrylate are mixed with 30 g of laurylmercaptan and dissolved in 400 g of methyl isobutyl ketone. 30 g of di-tert.-butyl peroxide are added thereto at 130°–140°C. The mixture is heated under reflux until the solids content has reached 70 %.

EXAMPLE 1

700 g of the resin solution obtained above (component $a_1$) are mixed with 710 g of pre-product I and heated to 110°C until the viscosity, measured at 50% strength in methyl isobutyl ketone at 25°C, has reached 436 cP. The solvent is then removed by vacuum distillation and the resin is diluted with ethylene glycol monobutyl ether to a solids content of 74 %. After neutralisation with ammonia, the product can be diluted with water in all proportions.

The resin is suitable for use as an electrophoretic single-coat resin and after stoving for 30 minutes at 170°C gives lacquer films of outstanding resistance to wash lyes (Test 1).

MANUFACTURE OF THE COMPONENT $a_2$ 400 g of 2-ethylhexyl acrylate, 150 g of allyloxypropanol, 100 g of acrylic acid, 350 g of styrene, 20 g of laurylmercaptan and 30 g of di-tert.-butyl peroxide are mixed. 250 g of the mixture are heated to 130°C.

After 40 minutes, the remaining 3/4 are added dropwise and the reaction mixture is kept at 130°C until the solids content has reached 96 % (1 hour at 110°C).

The unreacted monomers are then removed by vacuum distillation and 200 g of methyl isobutyl ketone are added.

EXAMPLE 2

600 g of this resin are then mixed with 750 g of pre-product IV and heated to 110°C until the viscosity, measured at 50 % strength in ethyl isobutyl ketone at 25°C, has risen to 300 cP. The solvent is removed by vacuum distillation and the resin is diluted to a solids content of 75 % with ethylene glycol monobutyl ether. After neutralisation with ammonia, the resin can be diluted with water in all proportions.

The resin can be used as an electrophoretic single-coat resin and after stoving for 30 minutes at 170°C gives films of very good resistance to wash lyes.

MANUFACTURE OF COMPONENT $a_3$ 400 g of 2-ethylhexyl acrylate,
150 g of allyloxypropanol,
250 g of styrene,
20 g of acrylic acid,
20 g of laurylmercaptan and
30 g of di-tert.-butylperoxide are mixed. 250 g of the mixture are heated to 130°C under reflux in a nitrogen gas atmosphere. After 40 minutes the remaining portion (three-fourths of the above mixture) are added dropwise and the mix is kept at 130°C until the solid content amounts to 96 % by weight. the monomers not reacted are removed by vacuum distillation, and the resin component $a_3$ is diluted with 200 g of methyl isobutyl ketone.

MANUFACTURE OF COMPONENT $a_4$ 200 g of butylene glycol and 400 g of vinylversatate are mixed. To this mixutre, which is kept in a flask with reflux condenser through which nitrogen gas is passed, a mixture of
200 g of acrylic acid,
200 g of hydroxyethyl acrylate,
200 g of methylmethacrylate,
25 g of di-tert.-butylperoxide,
10 g of laurylmercaptan and
200 g of butylene glycol is added dropwise.

After all is added, the reaction is continued by keeping the mix at 130°C until the solid content amounts to 70 % by weight. The solvent is removed vy vacuum distillation, and the resin component $a_4$ is diluted with 250 g of methylisobutyl ketone.

MANUFACTURE OF COMPONENT $a_5$

The procedure is as in the manufactue of component $a_4$, however, a mixture of 490 g of vinylversatate and 200 g of butylene glycol is employed as the starting mixture. A mixture of
200 g of acrylic acid,
160 g of hydroxybutyl acrylate,
150 g of methylmethacrylate,
25 g of di-tert.-butylperoxide,
10 g of laurylmercaptan and
200 g of ethylene glycol monobutyl ether is added dropwise. The resin component $a_5$ is also diluted with 250 g of methylisobutyl ketone after the solvent has been distilled off.

MANUFACTURE OF COMPONENT $a_6$

The procedure is as in the manufacture of component $a_4$, however, a mixture of 500 g of vinylversatate and 200 g of ethylene glycol monobutyl ether is employed as the mixture.
A mixture of
200 g of acrylic acid,
150 g of hydroxymethyl methacrylate,
25 g of di-tert.-butylperoxide,
5 g of laurylmercaptan and
200 g of ethylene glycol monobutyl ether is added dropwise. The resin component $a_6$ is diluted with 300 g of methyl ethyl ketone after removal of solvents by vacuum distillation.

MANUFACTURE OF COMPONENT $a_7$

A mixture of
200 g of acrylic acid,
150 g of hydroxymethyl methacrylate,
400 g of 2-ethylhexyl acrylate,
250 g of styrene,
30 g of di-tert.-butylperoxide and
15 g of laurylmercaptan are added dropwise at 130°C to 400 g of ethylene glycol monobutyl ether in a flask equipped with reflux condenser through which nitrogen gas is passed. The reaction is carried on at 130°C until the solids content amounts to 70 % by weight. The the solvent is removed by vacuum distillation and the resin component $a_7$ is diluted with 350 g of ethyl acetate.

MANUFACTURE OF COMPONENT $a_8$

A mixture of
200 g of acrylic acid,
150 g of hydroxyethyl methacrylate,
400 g of 2-ethylhexyl acrylate,
250 g of acrylonitrile,
20 g of di-tert.-butylperoxide and
25 g of laurylmercaptan is added dropwise to 400 g of xylene contained in a flask with reflux condenser through which nitrogen gas is passed, at reflux temperature. The reaction is continued at 130°C until a solids content of 70 % by weight is reached. A solution of component $a_8$ in xylene is obtained.

EXAMPLE 3

The resin solution $a_3$ is mixed with pre-product II in the weight ration 6:4 (relative to solids content). The mixture is heated to 90° to 100°C until the viscosity amounts to 500 cP, measured as 50 % strength solution in methyl isobutyl ketone at 25°C. Then the solvent is removed by vacuum distillation and the reaction product is diluted to a solics content of 70 % by weight using ethylene glycol monoethyl ether. After neutralising the obtained reaction product with dimethyl ethanol amine the product can be diluted with water in all proportions.

This solution is especially suited for electrophoretic primer coating and is furthermore suited for coatings, which are stable to wash lyes, in those cases in which a stronger yellowing during stoving of the resin is of no importance. The stoving of the coatings takes place at 170°C in 20 to 30 minutes.

EXAMPLE 4

The resin solution $a_3$ is mixed with pre-product III in the weight ration of 1:3 (relative to solids content). The mix is heated to 110°C until the viscosity amounts to 320 cP at 25°C measured as 50 % strength solution in methyl isobutyl ketone. The solvent is removed by vacuum distillation, and the obtained reaction product is diluted with ethylene glycol monoethyl ether to a solids content of 70 % by weight. After addition of such quantity of ammonia until a pH-value of 7.5 is reached, the neutralised product can be applied as single-coat binder. The thus produced films can be stoved at 170°C in 30 minutes.

EXAMPLE 5

The resin solution $a_4$ is mixed with pre-product V in the weight ration of 6:4 (relative to the solids content). The mixture is heated to 90°C and kept at this temperature until the viscosity rose to 270 cP, measured at 25°C as 50 % strength solution in methyl isobutyl ketone. The solvent is removed by vacuum distillation and the obtained reaction product is diluted with ethylene glycol monobutyl ether to a solids content of 70 % by weight. The reaction product is in all proportions waterdilutable after neutralisation with diisopropanol amine. The product is very suitable for the manufacture of single-layer coatings being deposited electrophoretically and stoved at 170°C in 20 to 30 minutes. These coatings are weather-resistant and stable to wash lye.

EXAMPLE 6

The resin solution $a_5$ is mixed with pre-product VI in the weight ration 6:4 (relative to solid content). The mix is heated to 90–100°C and kept at this temperature until the viscosity rose to 480 cP, measured at 50 % strength solution in methyl isobutyl ketone at 25°C. The solvent is then removed by vacuum distillation. The obtained reaction product is diluted to a solids content of 70 % by weight using ethylene glycol monobutyl ether. After being neutralised with triethyl amine, the reaction product can be diluted with water in all proportions. The product is suitable as single-coat lacquer which is applied electrophoretically and stoved at 170°C for 30 minutes. The coatings show a good stability to wash lye.

EXAMPLE 7

The resin solution $a_6$ is mixed with pre-product VII in the weight ratio of 5.5:4.5 (relative to solids content). The mix is heated to 100°C and kept at this temperature until the viscosity amounts to 500 cP at 25°C measured at 50 % strength solution in methyl isobutyl ketone. The solvent is removed by vacuum distillation, and the obtained reaction product is diluted to a solids content of 70 % by weight using a mixture of equal parts of ethylene glycol monobutyl ether and sec. butanol. After neutralisation with diisopropanol amine the product is dilutable with water in all proportions. The product may be used for the manufacture of highly glossy single-layer coatings deposited electrophoretically which show very good stability to wash lye after 30 minutes' stoving time at 170°C.

EXAMPLE 8

The resin solution $a_7$ is mixed with pre-product VIII in the weight ratio of 6:4 (relative to solids content). The mix is heated to 100°C and kept at this temperature until the viscosity amounts to 390 cP at 25°C measured as 50 % strength solution in methyl isobutyl ketone. The solvent is removed by vacuum distillation. The obtained reaction product is diluted to a solids content of 70 % by weight using ethylene glycol monobutyl ether. After neutralisation with dimethyl ethanol amide the product may be used as binder for single-coat lacquers. Films made thereof are stoved at 170°C for 30 minutes and are stable to wash lye.

EXAMPLE 9

The resin solution $a_8$ is mixed with pre-product VIII in the weight ration of 1:1 (relative to solids content). The mix is heated to 100°C and is kept at this temperature until the viscosity amounts to 270 cP at 25°C measured as 50 % strength solution in methyl isobutyl ketone. Then the solvent is removed by vacuum distillation. The obtained reaction product is diluted to a solids content of 70 % by weight using a mixture of equal parts ethylene glycol monobutyl ether and ethylene glycol monoethyl ether. After neutralising with ammonia the product may be used as binder for the manufacture of single-coat lacquers. Films thus obtained can be stoved at 170°C for 30 minutes and show the following properties: good stability to wash lye and good resistance against corrosion.

INVESTIGATIONS TO DEMONSTRATE THE TECHNICAL ADVANCE ACHIEVED

1. A resin according to Example 1 of the present invention was manufactured.

2. A resin according to Example 1 of French Patent Specification 1,524,720 was manufactured.

3. A resin according to Example 11 of German Offenlegungsschrift 2,020,905 was manufactured.

4. A resin according to Example 1 of German Offenlegungsschrift 2,118,692 or U.S. Pat. No. 3,773,729 was manufactured. The resin, in the solution described, displayed a strong thixotropy.

5. 330 parts of the product described as partially blocked isocyanate 1 in German Offenlegungsschrift 2,118,692 or U.S. Pat. No. 3,773,729 were added dropwise at 80°C to 1,150 parts of the acrylic resin described in Example 1 of the present invention. After a reaction time of 1 hour, the batch gelled. The resins according to No. 1–4 were pigmented with titanium dioxide using a pigment/binder ratio of 0.3:1. Resins No. 1, 2 and 4 were then neutralised with triethylamine and the pigment pastes were diluted to a solids content of 12 % with deionised water. Zinc phosphatised sheets were coated electrophoretically in these baths, to produce a coating thickness of about 22–25 $\mu$, and the coating was stoved for 30 minutes at 180°C. The resin according to No. 3 was diluted to spraying viscosity with water and a zinc-phosphatised sheet was also coated to a coating thickness of 22–25 $\mu$ by spraying and the coating stoved for 30 minutes at 180°C. The salt spray resistance (ASTM-B-114-64) and the wash lye resistance (treatment with 2 % strength detergent solution for 8 hours at the boil and 8 hours cold=1 cycle) were tested.

|  | No. 1 | No. 2 | No. 3 | No. 4 |
|---|---|---|---|---|
| ASTM 120 hours (best value 1, worst value 5) | 1 | 3 | 5 | 3 |
| Wash lye resistance | 2 cycles, in order | 0.5 cycle, completely destroyed | 0.2 cycle, completely destroyed | 0.8 cycle, completely destroyed |

By parts parts by weight are meant.

What is claimed is:

1. Process for the manufacture of thermosetting synthetic resins with urethane groups, which contain carboxyl groups and masked isocyanate groups and can be diluted with water after neutralization with ammonia or amines, and which are manufactured by reaction of a compound (a) which contains alcoholic hydroxyl groups and carboxyl groups, with a masked isocyanate (b) in inert organic solvents, characterized in that as the compound (a) there are used copolymers of two or more vinyl monomers, individually or as mixtures thereof, which contain alcoholic hydroxyl groups and carboxyl groups, have a molecular weight of about 300 to 10,000, a hydroxyl equivalent weight of 200 to 900 and acid numbers of about 30 to 150, based on carboxyl groups, and which must be soluble in inert polar organic solvents, only those copolymers being employed of which the carboxyl groups are not capable of significant reaction with masked isocyanate groups at temperatures of 80° to 150°C over the course of about one hour, and as the masked isocyanate (b) there is used a polyurethane which contains at least one masked isocyanate group and which has been obtained by reaction of a polyisocyanate with a free isocyanate group and at least one masked isocyanate and at most up to 5 masked isocyanate groups with a compound carrying alcoholic hydroxyl groups, having a molecular weight of about 120–2,000 and a hydroxyl equivalent weight of about 60–500, the compound having been chosen from the group consisting of esters of fatty acids with polyols, wherein the polyols should be at least trifunctional, and diols which carry terminal hydroxyl groups and in which 3 to 8 carbon atoms are aliphatically bonded between the hydroxyl groups, and that the components (a) plus (b) are reacted at temperatures of 80°–150°C, that the component (a) is employed in such amounts that the end product has acid numbers between about 30 and 120, that thee proportion of calculated isocyanate groups introduced when manufacturing the component (b) is between 7.5 and 20 percent by weight relative to the weight of the end product and that the end product is completely soluble in a 50 percent strength solution in ethylene glycol monobutyl ether and has a viscosity between 150 and 700 cP in this solution at 25°C and that the amount of the component (b) which is employed is such that the mixture of components (a) plus (b) before reaction contains 2 to 15 percent by weight of masked isocyanate groups relative to the sum of (a) plus (b).

2. Process according to claim 1 wherein component (a) comprises copolymers of 4–20 percent of acrylic acid, methacrylic acid or mixtures of acrylic acid and methacrylic acid, 40–70 percent of plasticizing copolymerized monomers selected from the group consisting of alkyl acrylates or alkyl methacrylates in which the alkyl radical contains 4 to 12 carbon atoms, and optionally 5–35 percent of styrene, vinyltoluene or acrylonitrile, 8 to 15 percent of hydroxyalkyl acrylate being contained in the acrylate or methacrylate copolymer, said hydroxyalkyl acrylate or methacrylate being defined by the general formula:

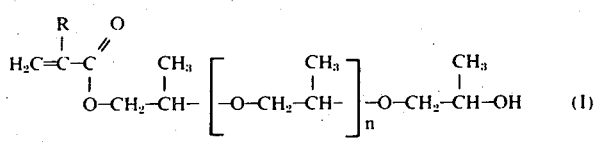

wherein $n$ represents values between 2 and 6, R is hydrogen or a methyl group and the compound of the formula (I) or mixtures of these compounds have hydroxy numbers of about 100 to 200.

3. Process according to claim 2 wherein the plasticizing copolymerized monomers includes an allyl compound selected from the group consisting of allyl alcohol, allyloxy propanol, trimethyl propane diallyl ether, pentaerythritol triallyl ether in place of the hydroxyalkyl acrylate or methacrylate component.

4. Process according to claim 2 wherein the plasticizing monomer is a vinyl ester of an α-alkylalkane monocarboxylic acid which is a mixture of $C_9$-, $C_{10}$- and $C_{11}$-monocarboxylic acids.

5. Process according to claim 1 wherein the masked polyisocyanates are mixtures of 65–80 percent by weight of 2,4-toluylene diisocyanate or hexamethylene diisocyanate and 35–20 percent by weight of 2,6-toluylene diisocyanate or hexamethylene diisocyanate.

6. Process according to claim 1 wherein the masked polyisocyanates employed contain phenol or ε-caprolactam as masking component.

7. A thermosetting synthetic resin produced according to the process of claim 1.

8. A process according to claim 1 wherein the esters of the fatty acids are with polyols which contain more than 3 but at most 6 hydroxyl groups per molecule.

* * * * *

UNITED STATES PATENT OFFICE
CERTIFICATE OF CORRECTION

Patent No. 3,897,377         Dated July 29, 1975

Inventor(s) Bernhard Broecker and Wolfram Plettner

It is certified that error appears in the above-identified patent and that said Letters Patent are hereby corrected as shown below:

[73] Assignee: --HOECHST AKTIENGESELLSCHAFT, Frankfurt, Germany--

Col. 6, line 42:   "at"   --as--
Col. 8, line 24:   "possble"   --possible--
Col. 11, line 50:  "vy"   --by--

Col. 12, line 57:  "solics"   --solids--
Col. 13, line 3:   "1:3"   --7:3--
Col. 15, line 10:  "By parts parts"   --By parts, parts--
Col. 15, line 48:  "thee"   --the--

Signed and Sealed this twenty-fourth Day of February 1976

[SEAL]

Attest:

RUTH C. MASON
Attesting Officer

C. MARSHALL DANN
Commissioner of Patents and Trademarks